(12) United States Patent
Miller

(10) Patent No.: US 11,950,524 B2
(45) Date of Patent: Apr. 9, 2024

(54) SPREADER AND RAKE HAND TOOL

(71) Applicant: Michael Miller, Celina, OH (US)

(72) Inventor: Michael Miller, Celina, OH (US)

( * ) Notice: Subject to any disclaimer, the term of this patent is extended or adjusted under 35 U.S.C. 154(b) by 883 days.

(21) Appl. No.: 16/939,877

(22) Filed: Jul. 27, 2020

(65) Prior Publication Data

US 2022/0022355 A1    Jan. 27, 2022

(51) Int. Cl.
*A01B 1/20*      (2006.01)
*A01D 7/00*      (2006.01)
*B25G 3/02*      (2006.01)
*E01C 19/44*     (2006.01)
*E04F 21/24*     (2006.01)

(52) U.S. Cl.
CPC ............... *A01B 1/20* (2013.01); *A01D 7/00* (2013.01); *B25G 3/02* (2013.01); *E01C 19/44* (2013.01); *E04F 21/241* (2013.01)

(58) Field of Classification Search
CPC ... A01D 7/02; A01D 7/06; A01D 7/10; A01D 7/00; E04F 21/241; E01C 19/44; A01B 1/20; B25G 3/02
See application file for complete search history.

(56) References Cited

U.S. PATENT DOCUMENTS

| | | | |
|---|---|---|---|
| 339,527 A | 4/1886 | Calef | |
| 354,355 A * | 12/1886 | Seatter | A01D 11/06 56/400.06 |
| 895,847 A | 8/1908 | Ditchfield | |
| 908,266 A | 12/1908 | Jackson | |
| 937,219 A * | 10/1909 | Morrill | A01D 11/06 56/400.06 |
| 1,138,274 A * | 5/1915 | Bozarth | A01D 11/06 56/400.06 |
| 1,666,374 A * | 4/1928 | Gatti | A01B 1/06 172/380 |
| 1,913,786 A * | 6/1933 | Barron | A01B 1/20 169/77 |
| 2,010,325 A * | 8/1935 | Sawyer | A01D 11/06 56/400.05 |
| 2,400,241 A * | 5/1946 | Linden | A01B 1/06 172/375 |
| 3,164,213 A * | 1/1965 | Lutz | A01B 1/20 56/400.06 |
| 3,213,476 A | 10/1965 | Lasker | |
| 3,335,557 A | 8/1967 | Boyer | |
| 3,430,704 A * | 3/1969 | Alosi | A01D 7/04 172/372 |
| 3,688,483 A * | 9/1972 | Hamilton | A01D 7/10 56/339 |
| 3,735,574 A * | 5/1973 | Heckner | A01D 7/00 172/380 |
| 3,952,812 A * | 4/1976 | Lucan | A01B 1/20 403/285 |

(Continued)

*Primary Examiner* — Abigail A Risic
(74) *Attorney, Agent, or Firm* — R. William Graham

(57) ABSTRACT

A hand tool includes a tool handle and a tool head having a body portion, with the handle secured to a back support plate portion which connects normal relative to the back plate portion, a first plate portion extending from a first side of the back plate portion having a toothed edge and a second plate portion extending from a second side of the back plate portion having a level edge, wherein each of the plate portions extend at an angle of from between 5 to 45 degrees relative to the back support plate portion.

8 Claims, 4 Drawing Sheets

(56) References Cited

U.S. PATENT DOCUMENTS

| | | | | |
|---|---|---|---|---|
| D282,621 S | * | 2/1986 | Nuorivaara | D8/13 |
| 4,901,801 A | * | 2/1990 | Popivalo | A01B 1/20 294/51 |
| D306,682 S | * | 3/1990 | Thompson | D8/13 |
| D344,661 S | * | 3/1994 | Schuele | A01D 7/00 D8/13 |
| 5,425,226 A | * | 6/1995 | Kaufman | A01D 11/06 403/354 |
| 6,052,982 A | * | 4/2000 | Haar | A01D 7/06 56/400.21 |
| 6,109,013 A | * | 8/2000 | Scott | A01D 7/10 56/400.05 |
| D560,451 S | * | 1/2008 | Silicato | D8/13 |
| D640,103 S | * | 6/2011 | Paolini | D8/13 |
| 2013/0247533 A1 | * | 9/2013 | Zupan | A46B 15/0055 56/400.01 |
| 2019/0045696 A1 | * | 2/2019 | Schoeppner | A01B 1/20 |
| 2020/0018072 A1 | * | 1/2020 | Hamelin-Roy | E04D 15/003 |
| 2022/0040545 A1 | * | 2/2022 | Heitfield | A01D 7/02 |

\* cited by examiner

SPREADER AND RAKE HAND TOOL

BACKGROUND OF THE INVENTION

Field of Invention

The instant invention relates to certain new and useful improvements in a combined spreader and rake hand tool. The invention also relates to improvements in a combined spreader and rake hand tool, which is particularly useful in moving gravel and leveling gravel and stone having sizes up to about 2 inches and is particularly adapted for spreading and smoothing aggregate for concrete, cement, or other materials which containing binder and an aggregate.

Prior Art

There exist many prior devices for moving ground material, such as rock, dirt, gravel, debris, leaves, etc. In the case of hand tools, these commonly include, rakes, spreaders and hoes. With respect to stone and aggregate, many factors dictate aggregate size, including particular application, method of placement, regional availability of materials, admixtures etc. and accordingly the type of hand tool which is used to move the same.

In the case of making a desired concrete surface and in order to minimize cracking, it is ideal to use a mix design containing aggregates ranging from natural sand, to 1¼" at an average of 18-22% of each size by weight. Hand tools available on the market today fail to provide an adequate tool for moving such aggregate by hand. Accordingly, there remains a need for an improved hand tool to aid in moving aggregate as well as other surface material.

SUMMARY OF INVENTION

It is an object to provide a tool of the above mentioned character that is simple and sturdy in construction and that is so constructed and arranged that it can be used as a tool for spreading material, such as stone and aggregate for concrete while the operator remains in a standing position, and the handle of the tool is inclined at a convenient angle for operating the same from the body portion or blade of the tool toward an operator.

A further object is to provide a dual function spreader and rake for multiple tasks, including raking stones, vines, debris, leaves, etc., and spreading and smoothing ground surface which may include dirt, rock, and/or aggregate.

A further object of this invention is to provide a spreader and rake having pitched teeth on a first elongated side of a back support plate connected to a handle, and having pitched edge on an opposing second elongated side of the back support plate.

A further object of this invention is to provide a readily cleanable spreader and rake.

A further object of this invention is to provide a unitary head forming part of a spreader and rake.

A further object of this invention is to provide a spreader and rake having a sufficient weight and strength structure to pulverize ground and rake loose material.

A further object of this invention is to provide a spreader and rake hand tool having pitched teeth on a first elongated side of a back support plate which provides sufficient rigidity and strength to cut and remove grass, vines or ground surface and will sink into loose dirt and will pulverize the dirt while the debris is being raked up.

A further object of this invention is to provide a hand spreader and rake may be turned over and using a pitched level edge to serve in pulling, pushing or spreading debris, aggregate or material along the ground.

Accordingly, the invention is directed to a spreader and rake tool including a head having a body portion or blade, preferably made of steel or other rigid material, that can be of uniform thickness from a toothed working edge thereof to the level working edge thereof, with a handle secured to a back support plate portion which connects normal relative to the back plate portion, a first plate portion extending from a first side of said back plate portion having the toothed edge and a second plate portion extending from a second side of said back plate portion having the level edge, wherein each of the plate portions extend at an angle of from between 5 to 45 degrees relative to the back support plate portion. To accomplish the purposes of the invention it is necessary that the axis of the handle extend at an angle of approximately 90 degrees to the back support plate portion, enabling the tool to be used both as a raking and spreading or leveling tool, in either case with the working edge thereof directed toward the operator and the handle inclined at an angle toward the operator so that the operator can stand in such a position as to rake or smooth surface material.

By the use of my invention, the operation of moving heavy and relatively large aggregate can be carried out successively from a standing position, because of the character of the tool comprising the rigid and durable blade with its angled plate portions present a unique tool which renders it easier to move aggregate and/or scraping, rake or smoothing operation to be performed while the operator is in a standing position greatly speeding up the operation over that possible with the tools previously used for this purpose. This is due to the fact that the unique blade configuration and with portions angled as previously stated, that the the blade or body portion can be engaged with the aggregate, debris or surface with the handle extending an angled relative to the surface in a most effective way in order to reduce fatigue of the user.

Other objects and advantages of my invention will appear as the description of the drawings proceeds. I desire to have it understood, however, that I do not intend to limit myself to the particular details shown and described, except as defined in the claims. With the above and related objects in view, this invention consists in the details of construction and combination of parts, as will be more fully understood from the following description, when read in conjunction with the accompanying drawing.

DETAILED DESCRIPTION OF PREFERRED EMBODIMENTS

Figure 1:
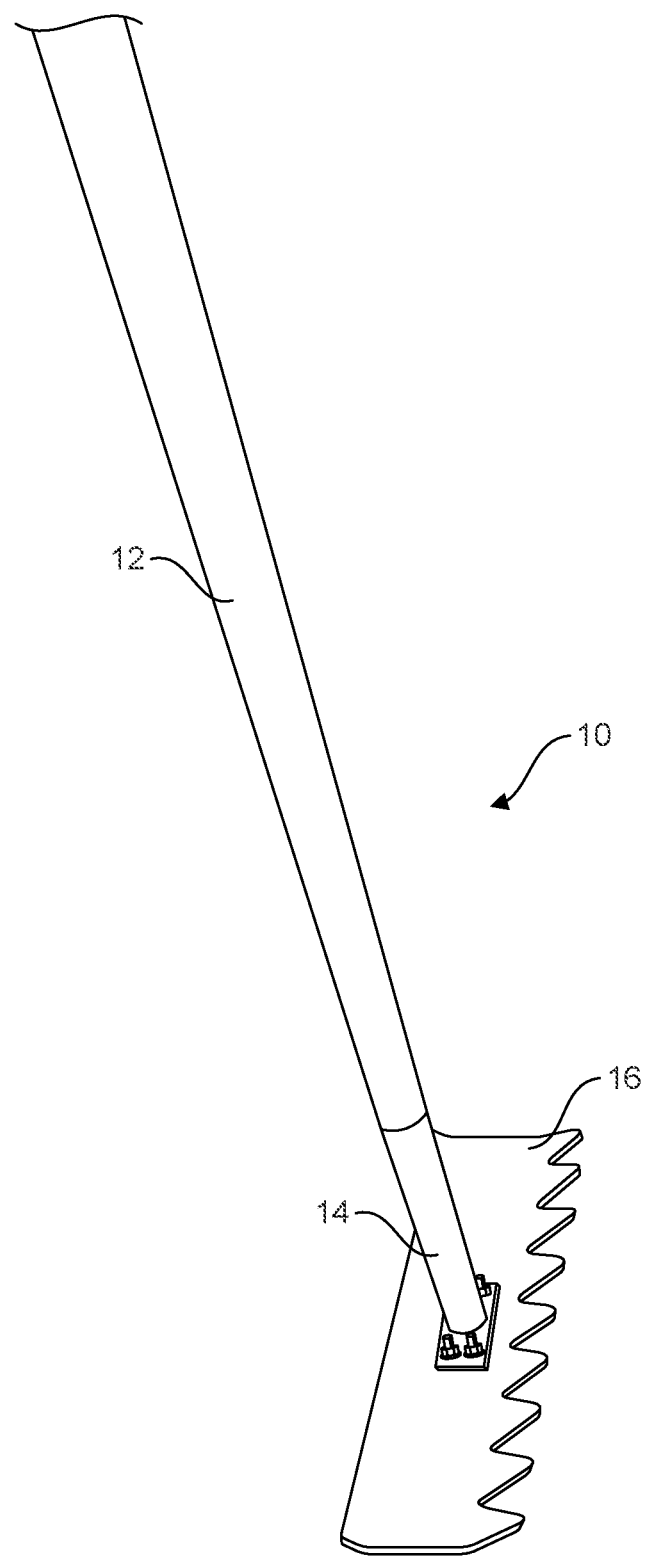
FIG. 1 is a perspective view of a combined spreader and rake, constructed in accordance with my invention.

Referring to the drawings, the spreader and rake tool of the instant invention is shown generally be the numeral 10. This spreader and rake tool 10 includes a conventional handle 12 made of wood, metal or other rigid material extending into a handle socket 14 which can metal or other rigid material to which is secured the spreader and spreader and rake head 16 in any manner known to the art, such as by nuts and bolts or rivet, for example. The spreader and rake head 16 is preferably of metal plate, as here shown, can be steel, stainless steel or other rigid material.

The spreader and rake head 16 has a body portion or blade 18, preferably made of steel or other rigid material, that can be of uniform thickness from a toothed working edge 20 thereof to the level working edge 22 thereof. The body portion 18 can preferably have a uniform thickness between at least 0.10 and 0.25 inch.

Handle socket 14 is secured to a back support plate portion 24 of blade 18 which connects normal relative thereto. A first plate portion 26 has the toothed working edge 20 and a second plate portion 28 has the level working edge 22, wherein the plate portions 26 extend at an angle (α) of from between 5 to 45 degrees relative to the back support plate portion 24. To accomplish the purposes of the invention it is necessary that the axis A of the handle 12 extend at an angle (β) of approximately 90 degrees to the base support plate portion 24, enabling the tool 10 to be used both as a raking, spreading or leveling tool, in either case with the working edge 20, 22 thereof directed toward the operator and the handle 12 inclined at an angle toward the operator so that the operator can stand in such a position as to rake or smooth surface material.

Figure 2:
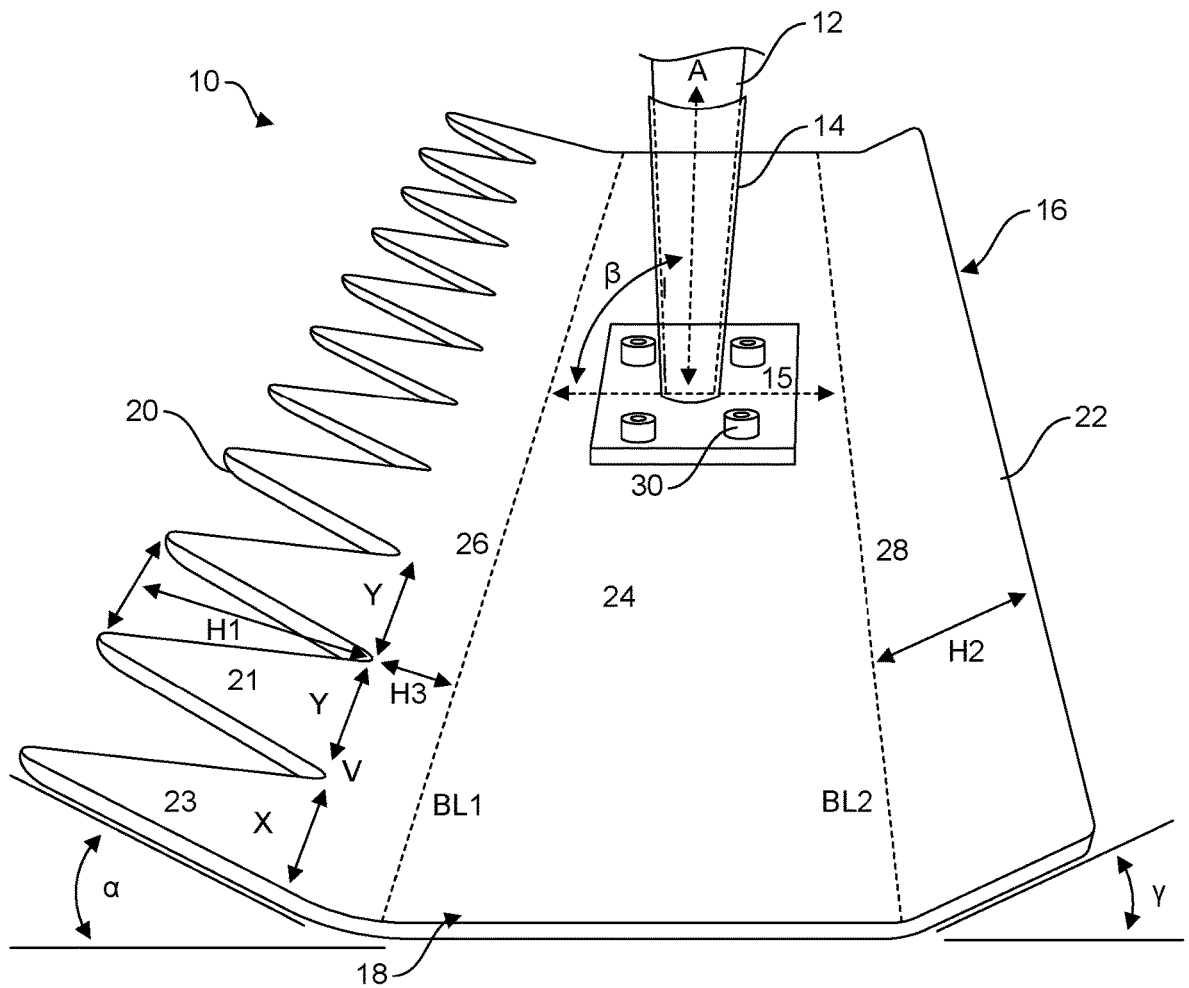
FIG. 2 is a perspective side view of the same.
Figure 3:
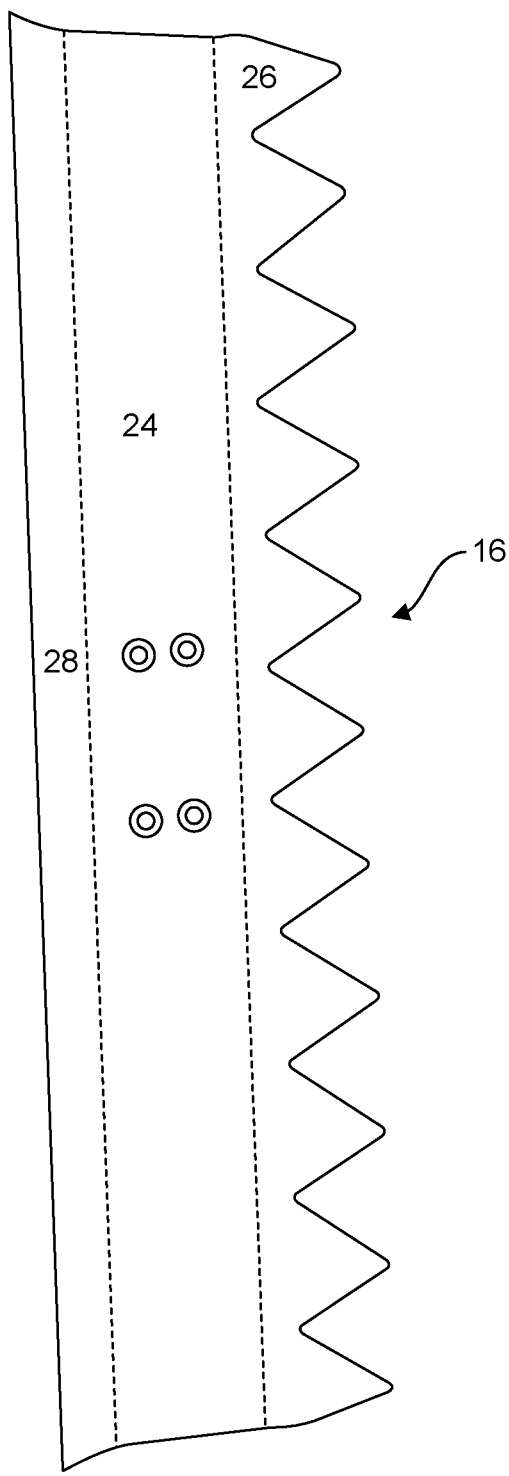
FIG. 3 is a top perspective view showing a part of my invention.
Figure 4:
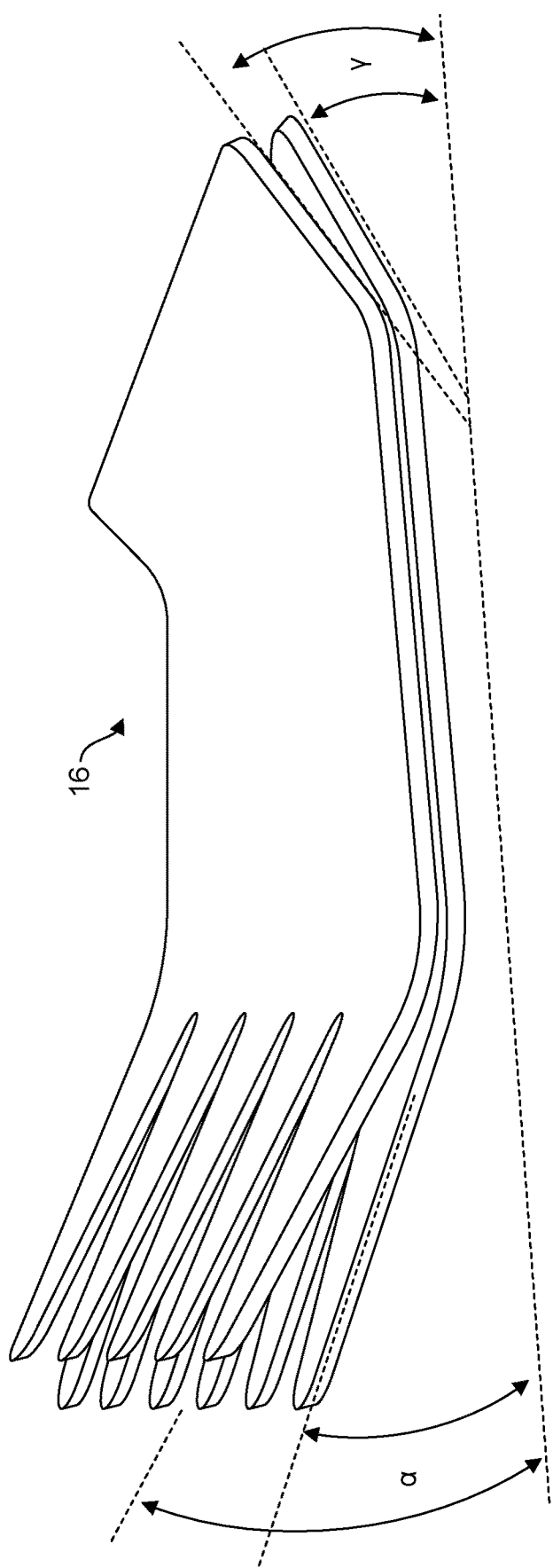
FIG. 4 is a side perspective view showing a range of pitch which for preferred working toothed edge of a part of the invention.

As seen in FIG. 2, the toothed working edge 20 includes a plurality of teeth 21, 23 which include a peak and valley which are displaced from a bend BL1 connecting back plate portion 24 to the first plate portion 26. A series of valleys (V) are preferable repeating at a distance (y) for example, approximately 2 inches, and hence inwardly disposed teeth 21 have a base of approximately 2 inches wide and a height of about 1.75 inches. It is contemplated that the height (H1) from bend BL1 and width can vary slightly to achieve the function described herein. The outer teeth 23 are similar in height and can be configured with a similar or a smaller base width (x) such as 1.5 inch which is found to be suitable for using the tool 10 in a canted manner and use as a pick. The teeth 21 and 23 have a generally triangular shape. The valley V can be displaced from the bend BL1 from about 0.25 to 1 inch as a function of bend of angle (α) with a smaller angle requiring less relative displacement. Note, the teeth 21 and 23 integrally extending from the first plate portion 26 a distance H3 which can be about 0.25 to 1 inch which is found to provide stability to the teeth 21 and 23 as opposed to bringing the valleys V to the bend line BL1.

The second plate portion 28 can have a height (H2) from bend BL2 of about 1 to 1.5 inches. The second plate portion 28 extend at an angle (γ) of from between 5 to 30 degrees relative to the back support plate portion 24 which provides overall increased strength for the head 16. This second plate portion 28 provides for leveling material within the ground surface post the raking which is performed by the first plate portion 26. Back support plate portion 24 can be detachably secured to a flange 15 of the handle socket 14 by bolts and nuts 30.

Working toothed edge 20 serve as a rake for moving aggregate or to move or cut in lawn or garden applications, while the teeth 21, 23 are rearwardly pitched with the rake handle 12 held at the normal raking angle, that the teeth 21, 23 will sink into loose garden dirt and will pulverize the dirt while the debris is being raked up, thus providing a highly desirable tool.

The tool 10 can be made of suitable materials, such as wood for handle 12 and for other components, metal such as iron, steel, or composite and of a suitable gauge. The gauge of the metal is preferably thick, for example, 0.125 to 0.25 inch, and substantial to assist in its function.

In operation, the spreading and rake tool 10 with the pitched teeth 21, 23 is used for raking aggregate, soil and serve to cut any surface material as it is drawn toward or pushed away from the operator. The particular design of the toothed working surface 20 renders the tool 10 substantially self cleaning, as the debris will fall away from the toothed working surface 20. Inverting the tool 10 provides for easy movement aggregate, soil or other underlying material.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A combined spreader and rake hand tool for moving gravel and stone, which comprises:
   a tool handle; and
   a tool head having a body portion, with said handle secured to a back support plate portion which connects normal relative to said back plate portion, a first plate portion extending from a first side of said back plate portion having a toothed edge and a second plate portion extending from a second side of said back plate portion having a level edge, wherein each of said plate portions extend at an angle of from between 5 to 45 degrees relative to said back support plate portion and an axis of said tool handle extends at an angle of approximately 90 degrees to said back support plate portion, enabling said tool to be used both as a raking and spreading or leveling tool, in either case with the working edge thereof directed toward the operator and the handle inclined at an angle toward the operator so that the operator can stand in such a position as to rake or smooth surface material, and wherein said toothed edge includes a plurality of triangular shaped teeth having a peak height between 1.5 and 2 inches and a base width of at least about 1.5 inches with generally flat faces, wherein said teeth include a peak and a valley which are displaced from a bend connecting said back plate portion to said first plate portion, wherein said valley is displaced from said bend from about 0.25 to 1 inch as a function of increased bend angle.

2. The combined spreader and rake hand tool of claim 1, wherein said tool head is made of one of iron, steel and stainless steel.

3. The combined spreader and rake hand tool of claim 1, wherein said first plate portion extends at less than 40 degrees from said back plate portion.

4. The combined spreader and rake hand tool of claim 1, wherein said second plate portion extends at less than 30 degrees from said back plate portion.

5. The combined spreader and rake hand tool of claim 1, wherein said body portion has a uniform thickness between at least 0.10 and 0.25 inch.

6. The combined spreader and rake hand tool of claim 1, wherein inwardly disposed teeth have a base width of about 2 inches and outwardly disposed teeth have a base of about 1.5 inches.

7. The combined spreader and rake hand tool of claim 1, wherein said second plate portion is about an inch in height.

8. The combined spreader and rake hand tool of claim 4, wherein said second plate portion is about an inch in height.

* * * * *